US012013197B2

(12) United States Patent
Tanimoto et al.

(10) Patent No.: US 12,013,197 B2
(45) Date of Patent: Jun. 18, 2024

(54) CLEANING METHOD AND INSPECTION METHOD FOR HEAT EXCHANGER, AND CLEANING EQUIPMENT FOR HEAT EXCHANGER

(71) Applicant: MITSUBISHI HEAVY INDUSTRIES, LTD., Tokyo (JP)

(72) Inventors: Koichi Tanimoto, Tokyo (JP); Nobuhide Hara, Tokyo (JP); Hiroyuki Nakaharai, Tokyo (JP); Yoichi Uefuji, Tokyo (JP); Takuo Oda, Tokyo (JP); Shunsaku Eguchi, Tokyo (JP); Masaya Hatanaka, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 57 days.

(21) Appl. No.: 17/800,947

(22) PCT Filed: Feb. 24, 2021

(86) PCT No.: PCT/JP2021/006901

§ 371 (c)(1),
(2) Date: Aug. 19, 2022

(87) PCT Pub. No.: WO2021/172368

PCT Pub. Date: Sep. 2, 2021

(65) Prior Publication Data

US 2023/0076052 A1 Mar. 9, 2023

(30) Foreign Application Priority Data

Feb. 27, 2020 (JP) ................................ 2020-031608

(51) Int. Cl.
*F28G 1/16* (2006.01)
*B08B 9/032* (2006.01)
(Continued)

(52) U.S. Cl.
CPC ............ *F28G 1/163* (2013.01); *B08B 9/0323* (2013.01); *B08B 13/00* (2013.01); *F28G 15/003* (2013.01); *B08B 2209/032* (2013.01)

(58) Field of Classification Search
CPC ...................................................... F28G 1/163
See application file for complete search history.

(56) References Cited

U.S. PATENT DOCUMENTS

2016/0058264 A1* 3/2016 Thiyagarajan ...... A47L 15/4282 134/172
2018/0345425 A1 12/2018 Caimano et al.

FOREIGN PATENT DOCUMENTS

JP 59-27102 A 2/1984
JP 61-115887 U 7/1986
(Continued)

OTHER PUBLICATIONS

Machine translation: KR20120005419A; Kong, K. (Year: 2012).*
(Continued)

*Primary Examiner* — Natasha N Campbell
(74) *Attorney, Agent, or Firm* — Birch, Stewart, Kolasch & Birch, LLP

(57) ABSTRACT

A cleaning method for a heat exchanger is a cleaning method for a heat exchanger which includes a header passage and a plurality of internal passages connected to the header passage, that includes: a step of supplying a cleaning fluid, via the header passage, to some of the plurality of internal passages connected to the header passage, selectively.

5 Claims, 14 Drawing Sheets

(51) Int. Cl.

| | |
|---|---|
| ***B08B 13/00*** | (2006.01) |
| ***F28G 15/00*** | (2006.01) |

(56) References Cited

FOREIGN PATENT DOCUMENTS

| | | | | |
|---|---|---|---|---|
| JP | 2019-27772 | A | | 2/2019 |
| JP | 2021-38894 | A | | 3/2021 |
| KR | 20120005419 | A | * | 1/2012 |

OTHER PUBLICATIONS

International Preliminary Report on Patentability and Written Opinion of the International Searching Authority for International Application No. PCT/JP2021/006901, dated Sep. 9, 2022, with a English translation.
International Search Report for International Application No. PCT/JP2021/006901, dated Apr. 13, 2021.

* cited by examiner

CLEANING METHOD AND INSPECTION METHOD FOR HEAT EXCHANGER, AND CLEANING EQUIPMENT FOR HEAT EXCHANGER

TECHNICAL FIELD

The present disclosure relates to a cleaning method and an inspection method for a heat exchanger, and a cleaning equipment for the heat exchanger.

The present application claims priority on Japanese Patent Application No. 2020-031608 filed on Feb. 27, 2020, the entire content of which is incorporated herein by reference.

BACKGROUND

Patent Document 1 discloses a heat exchanger in which a housing, a heat exchange bank, a collector manifold, an inlet manifold, an outlet manifold, and other parts are integrally formed as a single monolithic component.

CITATION LIST

Patent Literature

Patent Document 1: JP2019-27772A

SUMMARY

Technical Problem

Meanwhile, scale may adhere to an internal passage by using a heat exchanger. In such a case, it is desired to remove the scale adhering to the internal passage, but a technique for efficiently cleaning the internal passage has not been established.

In view of the above, an object of at least one embodiment of the present disclosure is to provide a cleaning method and an inspection method for a heat exchanger, and a cleaning equipment for the heat exchanger, which can efficiently cleaning an internal passage.

Solution to Problem

In order to achieve the above object, a cleaning method for a heat exchanger according to the present disclosure is a cleaning method for a heat exchanger which includes a header passage and a plurality of internal passages connected to the header passage, that includes: a step of supplying a cleaning fluid, via the header passage, to some of the plurality of internal passages connected to the header passage, selectively.

Further, an inspection method for a heat exchanger according to the present disclosure is an inspection method for a heat exchanger which includes a header passage and a plurality of internal passages connected to the header passage, that includes: a step of detecting a pressure of a supply line, while supplying a pressurized fluid from the supply line to the internal passages via the header passage; and a step of determining presence or absence of blockage in the internal passages based on a detection value of the pressure.

Furthermore, a cleaning equipment for a heat exchanger according to the present disclosure includes: a supply pipe which has an opening narrower than a connection area of the header passage where connections with the plurality of internal passages are arranged; a supply line connected to the supply pipe; and a boosting device for raising a pressure of a cleaning fluid supplied to the supply line.

Advantageous Effects

With the cleaning method for the heat exchanger according to the present disclosure, the plurality of internal passages connected to the header passage are cleaned in a plurality of batches, making it possible to efficiently clean the plurality of internal passages connected to the header passage with a small amount of the cleaning fluid.

With the inspection method for the heat exchanger according to the present disclosure, it is possible to determine the presence or absence of the blockage in the internal passages based on the detection value of the pressure of the supply line.

With the cleaning equipment for the heat exchanger according to the present disclosure, it is possible to sequentially change the internal passages to be cleaned, by sequentially changing the positions of the opening of the supply pipe with respect to the connection area of the header passage.

DETAILED DESCRIPTION

Figure 1:
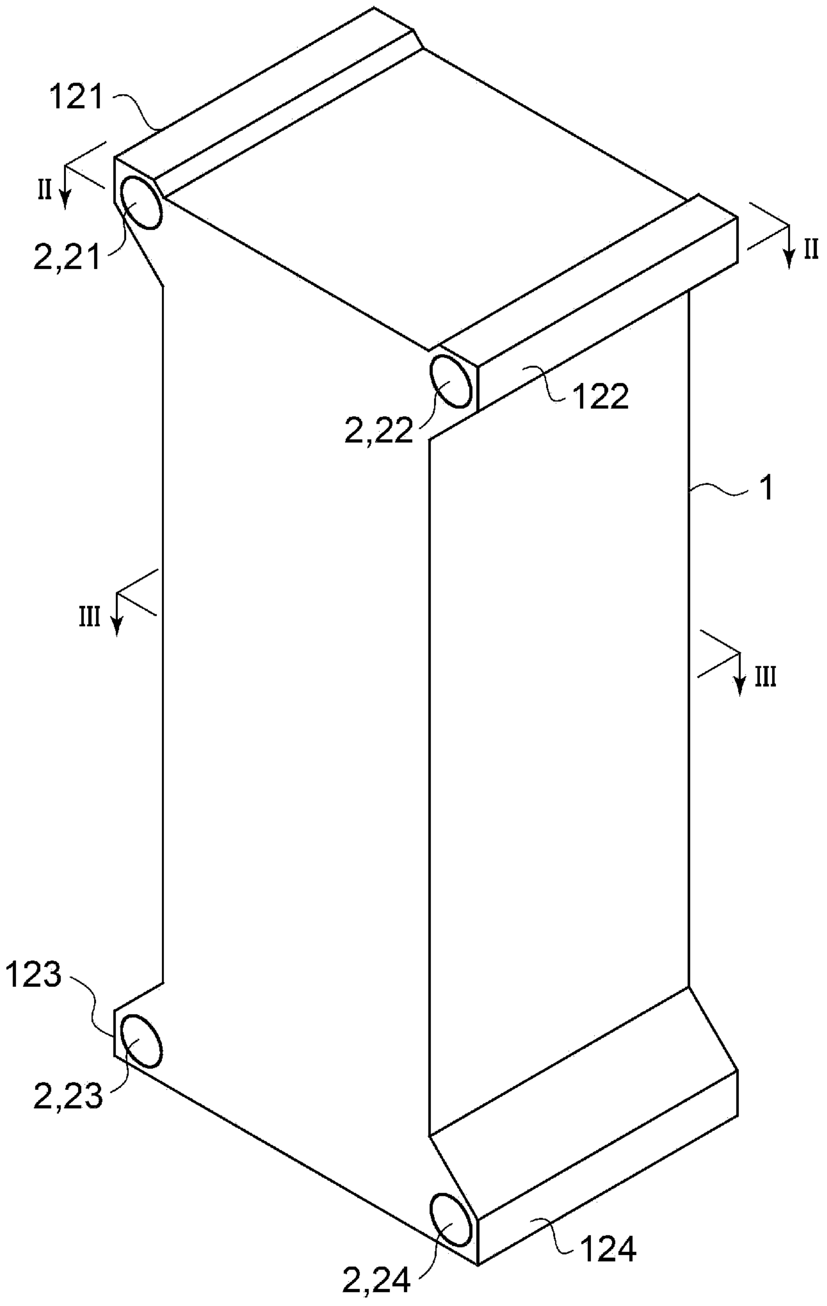
FIG. 1 is a view schematically showing the configuration of a heat exchanger to which a cleaning method for the heat exchanger is applied according to at least one embodiment of the present disclosure.

Hereinafter, a cleaning method and an inspection method for a heat exchanger 1 and a cleaning method for the heat exchanger 1 according to the embodiment of the present disclosure will be described with reference to the accompanying drawings. It is intended, however, that unless particularly specified, dimensions, materials, shapes, relative positions and the like of components described in the embodiment or shown in the drawings shall be interpreted as illustrative only and not intended to limit the scope of the present invention.

[Schematic Configuration of Heat Exchanger 1]

In the heat exchanger 1 to which the cleaning method for the heat exchanger 1 is applied according to the embodiment of the present disclosure, heat exchange is performed between a first fluid and a second fluid supplied to the heat exchanger 1. The first fluid and the second fluid supplied to the heat exchanger 1 may each be a liquid or a gas, but the temperatures of both are usually different.

As shown in FIG. 1, the heat exchanger 1 according to the embodiment of the present disclosure can have, for example, a rectangular solid shape, but is not limited thereto. For example, if the heat exchanger 1 has the rectangular solid shape, a pair of headers 121, 122, 123, 124 are disposed at one end (upper end) and another end (lower end) of the rectangular solid, respectively. For example, the headers 121, 122, 123, 124 respectively disposed in pairs at the one end and the another end of the rectangular solid are located at the four corners on the same plane of the rectangular solid.

For example, if the heat exchanger has the rectangular solid shape, the headers can be disposed outside the rectangular solid, but the present disclosure is not limited thereto. For example, if the headers 121, 122, 123, 124 respectively disposed in pairs at the one end and the another end of the rectangular solid are disposed outside the rectangular solid, they are disposed so as to project outward in a width direction of the rectangular solid. Then, the header 121 and 122 portions disposed at the one end of the rectangular solid serve as the first header 121 and the second header 122, respectively, and the headers 123 and 124 disposed at the another end serve as the third header 123 and the fourth header 124, respectively.

A header 12 is provided with a header passage 2. As described above, for example, if the heat exchanger 1 has the rectangular solid shape and the headers 121, 122, 123, 124 respectively disposed in pairs at the one end and the another end of the rectangular solid are disposed so as to project outward in the width direction of the rectangular solid, header passages 21, 22, 23, 23 are provided in the pair of headers 121, 122, 123, 124 disposed at the one end and the another end of the rectangular solid, respectively. Then, the header passage 21 provided in the first header 121 serves as the first header passage 21, and the header passage 22 provided in the second header 122 serves as the second header passage 22. Further, the header passage 23 provided in the third header 123 serves as the header passage 23, and the header passage 24 provided in the fourth header 124 serves as the fourth header passage 24.

In the heat exchanger 1 where the first fluid and the second fluid flow in directions opposed to each other (hereinafter, referred to as the "heat exchanger 1 of opposed flow"), the first header passage 21 serves as a passage for supplying the first fluid, and the second header passage 22 serves as a passage for discharging the second fluid. Further, the third header passage 23 serves as a passage for discharging the first fluid, and the fourth header passage 24 serves as a passage for supplying the second fluid. In the heat exchanger 1 where the first fluid and the second fluid flow in the same direction (hereinafter, referred to as the "heat exchanger 1 of parallel flow"), the second header passage 22 serves as a passage for supplying the second fluid, and the fourth header passage 24 serves as a passage for discharging the second fluid.

Figure 2:
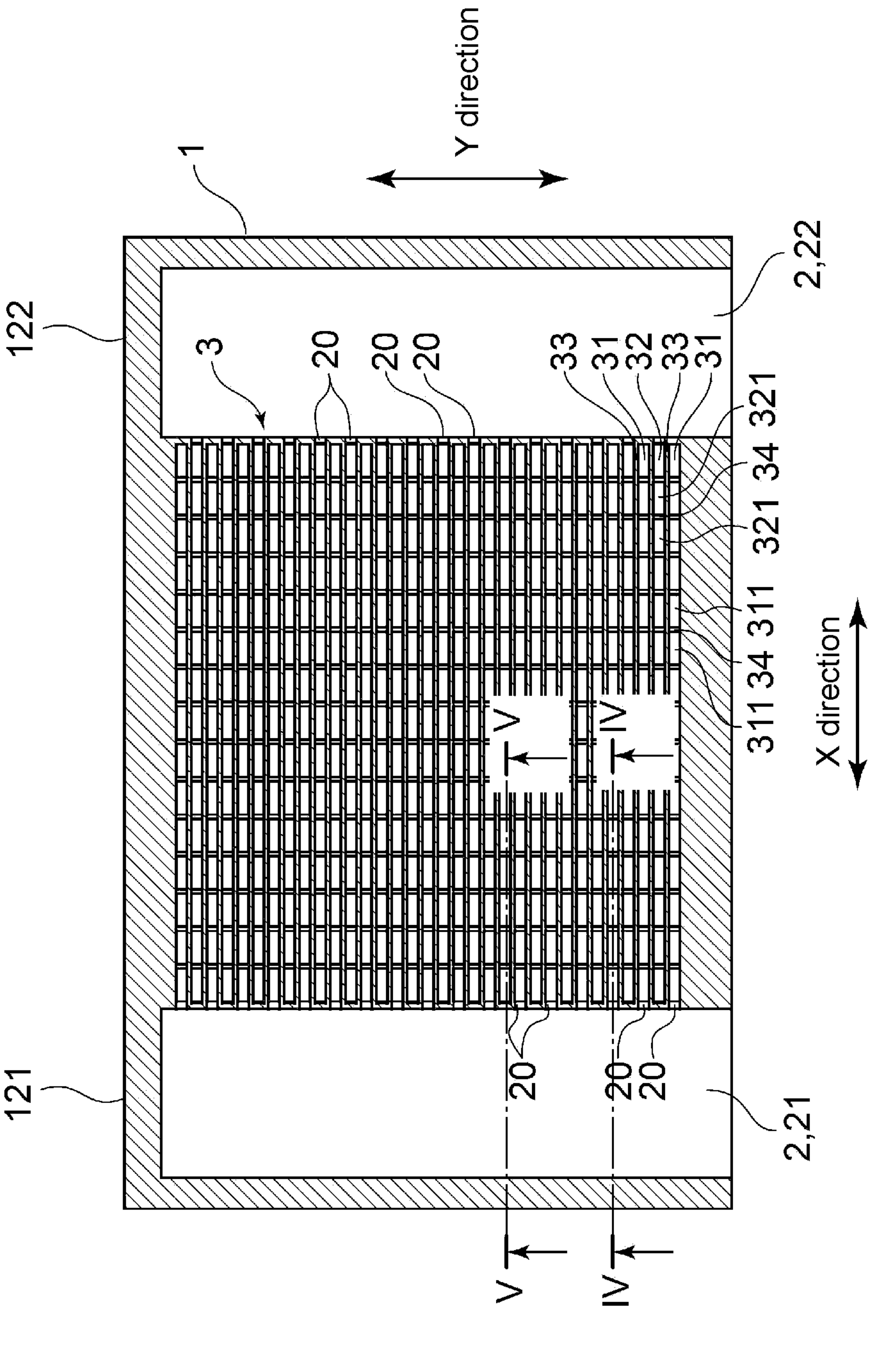
FIG. 2 is a cross-sectional view of the heat exchanger shown in FIG. 1, taken along line II-II.

As shown in FIG. 2, the heat exchanger 1 according to the embodiment of the present disclosure includes a plurality of internal passages 3. The plurality of internal passages 3 are connected to the above-described header passage 2. The plurality of internal passages 3 are connected to the header passage 2 at different positions in an extension direction of the header passage 2 (hereinafter, a section where the internal passage 3 is connected to the header passage 2 will be referred to as a "connection 20"). For example, the plurality of internal passages 3 are passages extending in parallel to each other, and the plurality of internal passages 3 are connected to the header passage 2 at ends of the plurality of internal passages 3 in the extension direction of the internal passages 3, and the plurality of internal passages 3 communicate with the header passage 2. For example, if the heat exchanger 1 has the rectangular solid shape, the plurality of internal passages 3 are disposed along the longitudinal direction of the rectangular solid. Then, the plurality of internal passages 3 are connected to the first header passage 21 or the second header passage 22 disposed at the one end (upper end) of the rectangular solid, and are connected to the third header passage 23 or the fourth header passage 24 disposed at the another end of the rectangular solid.

Figure 3:
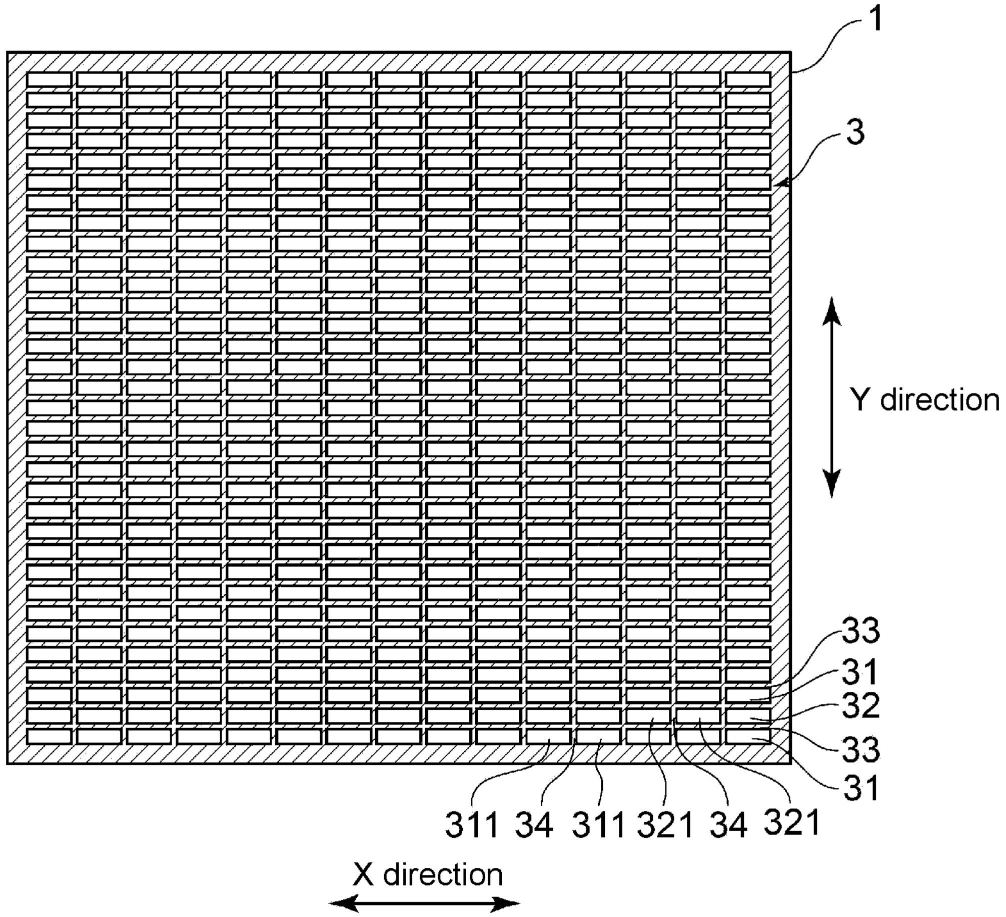
FIG. 3 is a cross-sectional view of the heat exchanger shown in FIG. 1, taken along line III-III.

As shown in FIG. 3, the plurality of internal passages 3 constitute a plurality of first passages 31 through which the first fluid flows and a plurality of second passages 32 through which the second fluid flows. The plurality of first passages 31 and the plurality of second passages 32 are alternately disposed in a depth direction (Y direction in FIG. 3) in a cross section orthogonal to the longitudinal direction of the rectangular solid, and the first passage 31 and the second passage 32 adjacent to each other are separated by a partition wall 33. The number of plurality of first passages 31 and plurality of second passages 32, that is, the number of partition walls 33 is not limited to the number shown in FIG. 3, but can be any number.

For example, the plurality of first passages 31 and the plurality of second passages 32 are divided into a plurality of divided passages 311 and 321, respectively, but the present disclosure is not limited thereto. If the plurality of first passages 31 and the plurality of second passages 32 are divided into the plurality of divided passages 311 and 321, respectively, the respective plurality of divided passages 311 and 321 of the plurality of first passages 31 and the plurality of second passages 32 are disposed along the width direction (X direction in FIG. 3) in the cross section orthogonal to the rectangular solid, and the divided passage 311 (321) and the divided passage 311 (321) adjacent to each other are separated by a dividing wall 34. The number of dividing walls 34 provided in the plurality of first passages 31 and the plurality of second passages 32 is not limited to the number shown in FIG. 3, but can be any number.

Figure 4:
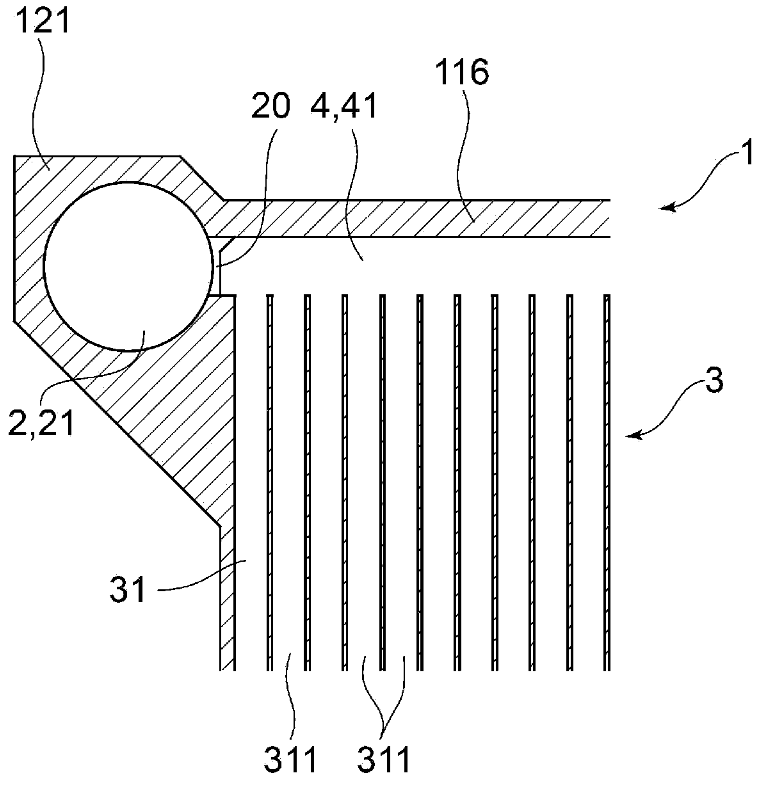
FIG. 4 is a cross-sectional view taken along line IV-IV shown in FIG. 2.
Figure 5:
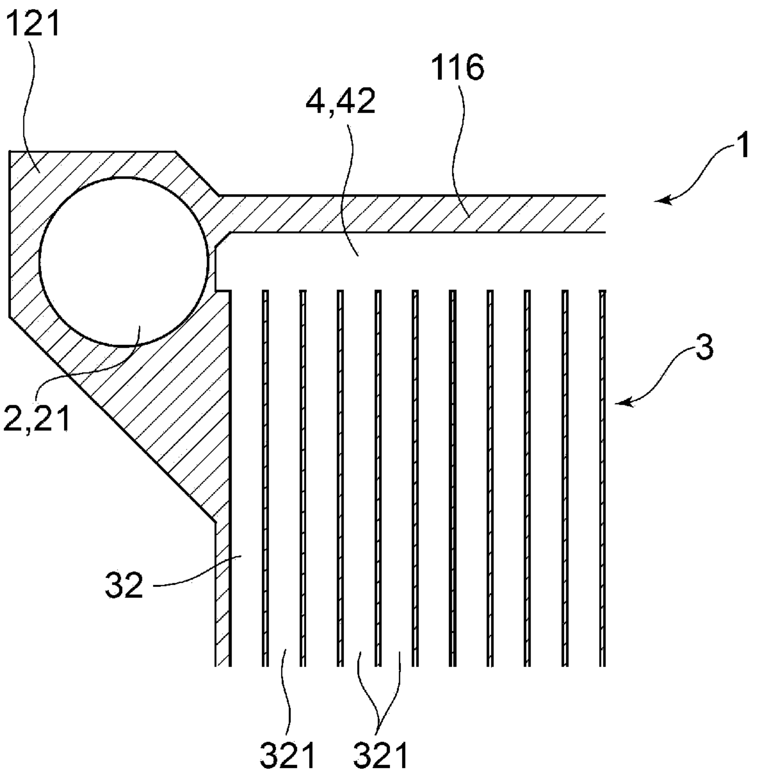
FIG. 5 is a cross-sectional view taken along line V-V shown in FIG. 2.

As will be described later, FIG. 4 is a view of an intermediate passage 41 through which the first header passage and the first passage communicate with each other, and FIG. 5 is a view of an intermediate passage 42 through which the first header passage and the second passage do not communicate with each other.

As shown in FIGS. 4 and 5, if the plurality of first passages 31 and the plurality of second passages 32 are divided into the plurality of divided passages 311 and 321, respectively, intermediate passages 4 are disposed at one end and another end of each of the plurality of first passages 31 and at one end and another end of each of the plurality of second passages 32.

As shown in FIG. 4, the intermediate passage 41 (hereinafter, referred to as the "first intermediate passage 41") disposed at the one end (upper end) of the first passage 31 communicates with the plurality of divided passages 311, which are divided in the first passage 31, at one end (upper end) of each of the plurality of divided passages 311 in an extension direction of the divided passages 311 (an extension direction of the first passage 31). The first intermediate passage 41 opens at the one end (upper end) of the first passage 31, while being separated from the outside by an outer wall (top wall) 116. As shown in FIG. 5, the intermediate passage 42 (hereinafter, referred to as the "second intermediate passage 42") disposed at the one end (upper end) of the second passage 32 communicates with the plurality of divided passages 321, which are divided in the second passage 32, at one end (upper end) of each of the plurality of divided passages 321 in an extension direction of the divided passages 321 (an extension direction of the second passage 32). The second intermediate passage 42 opens at the one end (upper end) of the second passage 32, while being separated from the outside by the outer wall (top wall) 116. Although not shown, the intermediate passage (hereinafter, referred to as the "third intermediate passage") disposed at the another end (lower end) of the first passage 31 communicates with the plurality of divided passages 311, which are divided in the first passage 31, at another end (lower end) of each of the plurality of divided passages 311 in the extension direction of the divided passages 311 (the extension direction of the first passage 31). The third intermediate passage opens at the another end (lower end) of the first passage 31, while being separated from the outside by an outer wall (bottom wall) 111. The intermediate passage (hereinafter, referred to as the "fourth intermediate passage") disposed at the another end (lower end) of the second passage 32 communicates with the plurality of divided passages 321, which are divided in the second passage 32, at another end (lower end) of each of the plurality of divided passages 321. The fourth intermediate passage opens at the another end (lower end) of the second passage 32, while being separated from the outside by the outer wall (bottom wall) 111.

As shown in FIG. 4, the first header passage 21 extends in a direction orthogonal to the extension direction of the first passage 31 and is connected to the first passage 31 via the first intermediate passage 41, at the one end (upper end) of the first passage 31 in the extension direction of the first passage 31. Thus, the second header passage 22 and the first passage 31 communicate with each other. As shown in FIG. 5, the second header passage 22 extends in a direction orthogonal to the extension direction of the second passage 32 and is connected to the second passage 32 via the second intermediate passage 42, at the one end (upper end) of the second passage 32 in the extension direction of the second passage 32. Thus, the second header passage 22 and the second passage 32 communicate with each other. Although not shown, the third header passage 23 extends in the direction orthogonal to the extension direction of the first passage 31 and is connected to the first passage 31 via the third intermediate passage, at the another end (lower end) of the first passage 31 in the extension direction of the first passage 31. Thus, the third header passage 23 and the first passage 31 communicate with each other. The fourth header passage 24 extends in the direction orthogonal to the extension direction of the second passage 32 and is connected to the second passage 32 via the fourth intermediate passage, at the another end (lower end) of the second passage 32 in the extension direction of the second passage 32. Thus, the fourth header passage 24 and the second passage 32 communicate with each other.

[Cleaning Equipment 5 for Heat Exchanger 1]

Figure 6:
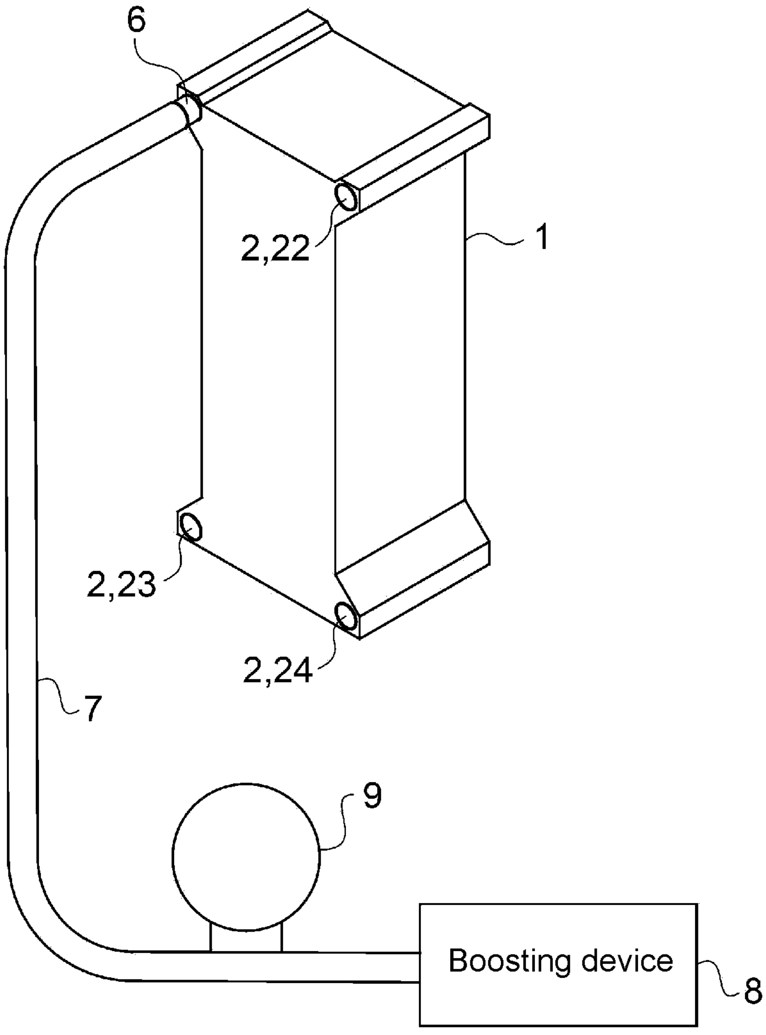
FIG. 6 is a view schematically showing the configuration of a cleaning equipment for the heat exchanger according to an embodiment of the present disclosure.

As shown in FIG. 6, a cleaning equipment 5 for the heat exchanger 1 according to the embodiment of the present disclosure includes a supply pipe 6, a supply line 7, and a boosting device 8. The supply pipe 6 is for supplying a cleaning fluid to the header passage 2. The cleaning fluid may be either a gas or a liquid. For example, the cleaning fluid is, but is not limited to, air or water. For example, a solvent for dissolving scale can be used, if it is assumed that the scale adheres to the passage.

Figure 7:
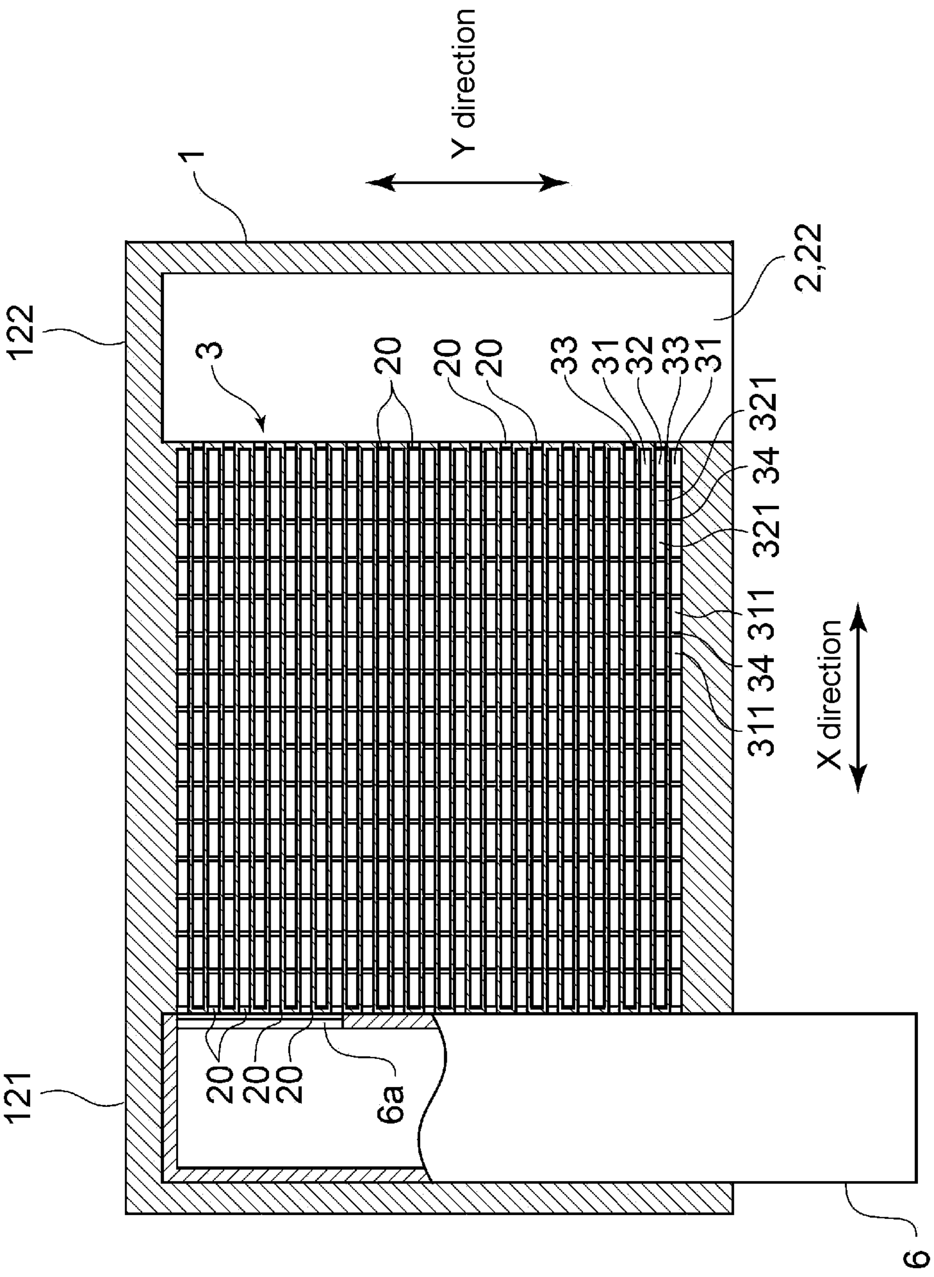
FIG. 7 is a conceptual view showing a state in which a supply pipe is inserted into the heat exchanger.

As shown in FIG. 7, the supply pipe 6 can be inserted into the header passage 2 described above. For example, the supply pipe 6 is constituted by a pipe which is slightly thinner than the header passage 2, so that the cleaning fluid does not leak from between the header passage 2 and the supply pipe 6 in a state of being inserted into the header passage 2. The supply pipe 6 has an opening **6*a* narrower than a connection area where the connections 20 with the plurality of internal passages 3 connected to the header passage 2 are arranged. Thus, the opening 6*a* can supply the cleaning fluid to some of the plurality of internal passages 3 connected to the header passage 2. The size of the opening 6*a* is determined by the number of internal passages 3 to be washed at one time among the plurality of internal passages 3 connected to the header passage 2. The supply line 7 is connected to the supply pipe 6 and supplies the cleaning fluid to the supply pipe 6 from a fluid supply source. The boosting device 8 is a device for raising a pressure of the cleaning fluid supplied to the supply line 7, and is, for example, a compressor or a pump. The boosting device 8 may be the boosting device 8, such as a displacement pump, for realizing a constant flow rate by a rotation speed, or may be the boosting device 8** for controlling a discharge pressure to be constant.

With the cleaning equipment 5 for the heat exchanger 1 thus configured, it is possible to sequentially change the internal passages 3 to be cleaned, by sequentially changing the positions of the opening of the supply pipe 6 with respect to the connection area where the connections 20 with the plurality of internal passages 3 connected to the header passage 2 are arranged.

Configuration Example 1 of Supply Pipe 6

Figure 8:
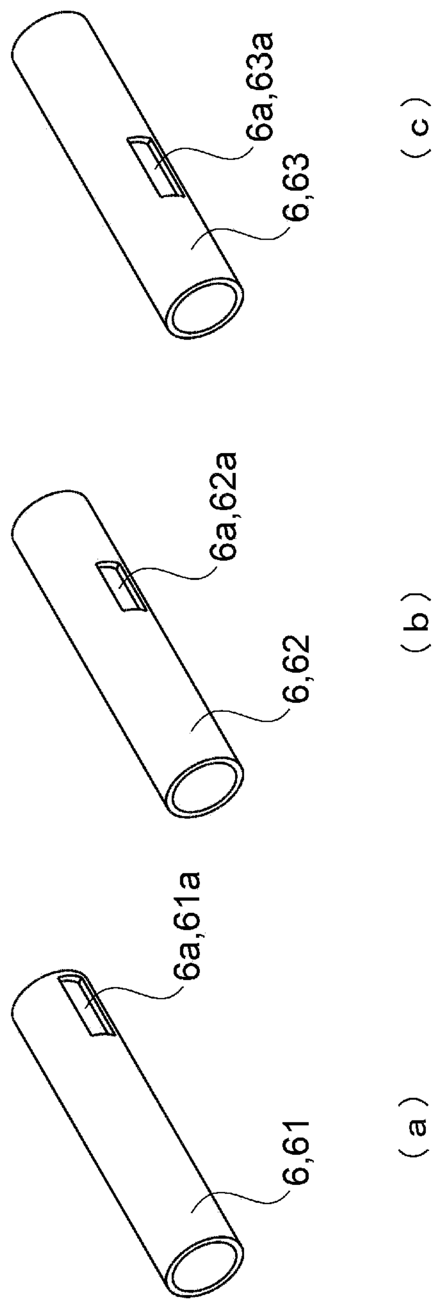
FIG. 8 is a view schematically showing configuration example 1 of the supply pipe.

As shown in FIG. 8, the supply pipes 6 (61, 62, 63) are the plurality of types of supply pipes 61, 62, 63 in which formation positions of openings **61*a*, 62*a*, 63*a* in the extension direction of the header passage 2 are different. The formation positions of the openings 61*a*, 62*a*, 63*a* are set according to the arrangement of the connections 20 for each of a plurality of cleaning areas which are obtained by dividing the connection area where the connections 20 with the plurality of internal passages 3 connected to the header passage 2 are arranged. For example, in the example shown in FIG. 7, the connection area is divided into three cleaning areas, the back, the center, and the front, and the formation positions of the openings 61*a*, 62*a*, 63*a*** are set for each of the cleaning areas, like the tip, the center, and the root.

With the supply pipe 6 (61, 62, 63) thus configured, it is possible to supply the cleaning fluid to the plurality of internal passages 3 to be cleaned, by inserting the supply pipes 61, 62, 63 respectively corresponding to the plurality of internal passages 3 to be cleaned into the header passage 2. In the supply pipes 61, 62, 63, the formation positions of the openings 61*a*, 62*a*, 63*a* are different in the extension direction of the header passage 2, and thus positioning is performed by inserting the supply pipes 61, 62, 63 until they hit the back wall of the header passage 2. Further, by sequentially exchanging the supply pipes 61, 62, 63, it is possible to sequentially change the internal passages 3 to be cleaned.

Configuration Example 2 of Supply Pipe 6

Figure 9:
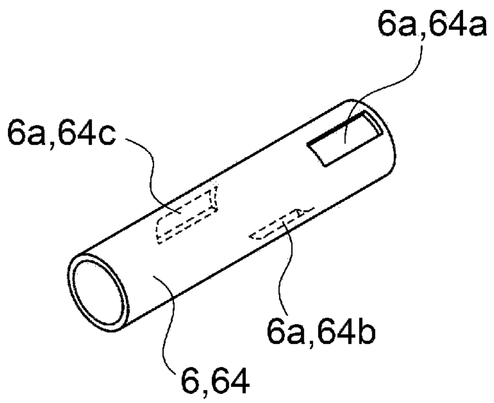
FIG. 9 is a view schematically showing configuration example 2 of the supply pipe.

As shown in FIG. 9, the supply pipe 6 (64) has a plurality of types of openings 64*a*, 64*b*, 64*c* disposed at a plurality of positions in the extension direction of the header passage 2 and at different circumferential positions. The plurality of positions in the extension direction of the header passage 2 are set according to the arrangement of the connections 20 for each of the plurality of cleaning areas which are obtained by dividing the connection area where the connections 20 with the plurality of internal passages 3 connected to the header passage 2 are arranged. The different circumferential positions of the header passage 2 are set, for example, by dividing the outer circumference of the supply pipe 64 at equal intervals. For example, in the example shown in FIG. 9, the different circumferential positions of the header passage 2 are set by dividing the outer circumference of the supply pipe 64 into three parts at 120 degrees. Further, the different circumferential positions of the header passage 2 are determined by matching a mark disposed in an opening edge portion of the header passage 2 with a mark disposed in the supply pipe 64.

With the supply pipe 6 (64) thus configured, by sequentially rotating a single supply pipe 64 in the header passage 2, it is possible to sequentially change the internal passages 3 to be cleaned.

Configuration Example 3 of Supply Pipe 6

Figure 10:
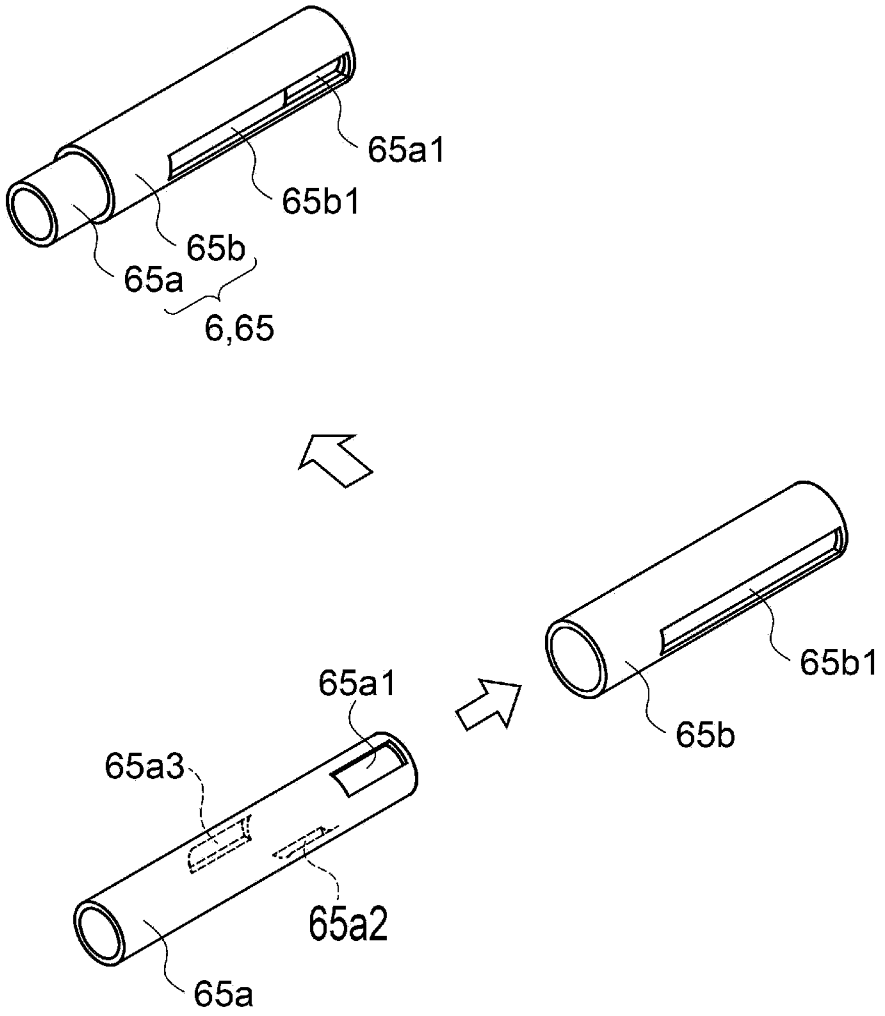
FIG. 10 is a view schematically showing configuration example 3 of the supply pipe.

As shown in FIG. 10, the supply pipe 6 (65) includes a supply pipe body 65*a* and a sleeve 65*b* into which the supply pipe body 65*a* is slidably inserted. Similar to the supply pipe 64 shown in the configuration example described above, the supply pipe body 65*a* has a plurality of types of openings 65*a*1, 65*a*2, 65*a*3 disposed at a plurality of positions in the extension direction of the header passage 2 and at different circumferential positions. The sleeve 65*b* has an opening 65*b*1 over the entire connection area where the connections 20 with the plurality of internal passages 3 connected to the header passage 2 are arranged. Then, by superimposing any one of the plurality of types of openings 65*a*1, 65*a*2 or 65*a*3 disposed in the supply pipe body 65*a* with the opening 65*b*1 disposed in the sleeve 65*b*, it is possible to supply the cleaning fluid to the plurality of internal passages 3 to be cleaned.

With the supply pipe 6 (65) thus configured, by forming the sleeve 65*b* by a soft material with respect to the header passage 2, it is possible to suppress damage to the header passage 2. Further, the supply pipe body 65*a* can be rotated with respect to the sleeve 65*b*, allowing the supply pipe body 65*a* to smoothly rotate.

[Detection Device 9]

As shown in FIG. 6, the cleaning equipment 5 for the heat exchanger 1 further includes the detection device 9 for detecting a parameter indicating a pressure loss of the internal passage 3. The parameter indicating the pressure loss of the internal passage 3 is a pressure on the upstream side of the header passage 2, a flow rate passing through the internal passage 3, or the like, and is composed of, for example, a pressure gauge or a flow meter.

With the cleaning equipment 5 for the heat exchanger 1 thus configured, since the detection device 9 detects the parameter indicating the pressure loss of the internal passage 3, it is possible to determine the presence or absence of blockage in the internal passage 3 to be cleaned. Further, if the parameter for detecting the pressure loss is the pressure (supply pressure) of the cleaning fluid on the upstream side of the header passage 2, it is possible to determine the end of supply of the cleaning fluid based on the supply pressure of the cleaning fluid.

[Cleaning Method for Heat Exchanger 1]

Figure 11:
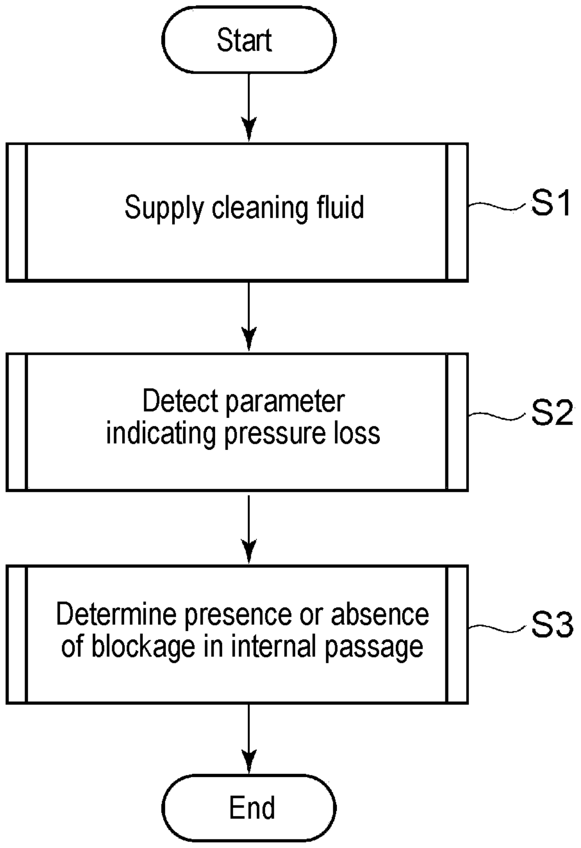
FIG. 11 is a flowchart for describing a cleaning method for the heat exchanger according to at least one embodiment of the present disclosure.

The cleaning method for the heat exchanger 1 according to the embodiment of the present disclosure is a cleaning method for the heat exchanger 1 which includes the header passage 2 and the plurality of internal passages 3 connected to the header passage 2. As shown in FIG. 11, the cleaning method for the heat exchanger 1 includes a step (step S1) of supplying the cleaning fluid, via the header passage 2, to some of the plurality of internal passages 3 connected to the header passage 2, selectively.

With such cleaning method for the heat exchanger 1, the plurality of internal passages 3 connected to the header passage 2 are cleaned in a plurality of batches, making it possible to efficiently clean the plurality of internal passages 3 connected to the header passage 2 with a small amount of the cleaning fluid.

[Step (Step S1) of Supplying Cleaning Fluid]

Figure 12:
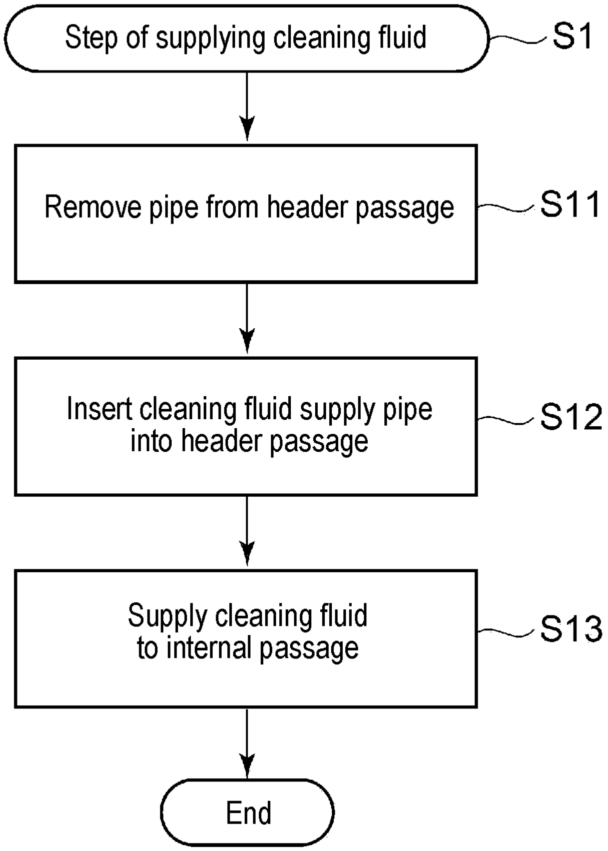
FIG. 12 is a flowchart showing the contents of a step of supplying a cleaning fluid shown in FIG. 11.

The step (step S1) of supplying the cleaning fluid includes inserting, into the header passage 2, the supply pipe 6 which has the opening 6*a* narrower than the connection area of the header passage 2 where the connections 20 with the plurality of internal passages 3 are arranged, and selectively supplying the cleaning fluid to the internal passages 3 which have the connections 20 located within the formation range of the opening 6*a*. For example, if the heat exchanger 1 is in use, as shown in FIG. 12, the pipe is removed from the heat exchanger 1 (step S11), and the supply pipe 6 is inserted into the header passage 2 (step S12), and the cleaning fluid is supplied to the internal passages 3 which have the connections 20 located within the formation range of the opening 6*a* (step S13). The cleaning fluid may be either a gas or a liquid. For example, the cleaning fluid is, but is not limited to, air or water. For example, a solvent for dissolving scale can be used, if it is assumed that the scale adheres to the passage.

With such cleaning method for the heat exchanger 1 including the step (step S1) of supplying the cleaning fluid, it is possible to sequentially change the internal passages 3 to be cleaned, by sequentially changing the positions of the opening of the supply pipe 6 with respect to the connection area where the connections 20 with the plurality of internal passages 3 connected to the header passage 2 are arranged.

[Change of Cleaning Fluid Supply Target—Part 1—]

In the supply pipe 6 (61, 62, 63) shown in configuration example 1 described above, the plurality of types of supply pipes 61, 62, 63 having the different formation positions of the openings 61*a*, 62*a*, 63*a* in the extension direction of the header passage 2 are exchanged to sequentially change the internal passages 3 to be supplied with the cleaning fluid. For example, as shown in FIG. 7, if the connection area where the connections 20 with the plurality of internal passages 3 connected to the header passage 2 are arranged is divided into the three cleaning areas of the tip, the center, and the root, the cleaning fluid is supplied to the plurality of internal passages 3 arranged in the back by the exchange for the supply pipe 61 having the formation position of the opening 61*a* at the tip as shown in (a), and the cleaning fluid is supplied to the plurality of internal passages 3 arranged in the center by the exchange for the supply pipe 62 having the forming position of the opening 62*a* in the center as shown in (b). Further, the cleaning fluid is supplied to the plurality of internal passages 3 arranged in front by the exchange for the supply pipe 63 having the formation position of the opening 63*a* at the root as shown in (c).

With such method, by sequentially exchanging the supply pipes 61, 62, 63, it is possible to sequentially change the internal passages 3 to be cleaned.

[Change of Cleaning Fluid Supply Target—Part 2—]

In the supply pipe 6 (64) shown in configuration example 2 described above, the supply pipe 64, which has the plurality of types of openings 64*a*, 64*b*, 64*c* disposed at the plurality of positions in the extension direction of the header passage 2 and at the different circumferential positions, is rotated to sequentially change the internal passages 3 to be supplied with the cleaning fluid. For example, in the example shown in FIG. 9, since the outer circumference of the supply pipe 64 is divided into three parts at 120 degrees, the mark disposed in the opening edge portion of the header passage 2 is matched with the mark disposed in the supply pipe 64, thereby rotating the supply pipe 64 by 120 degrees to change the internal passages 3 to be supplied with the cleaning fluid.

With such method, by sequentially rotating the supply pipe 64 in the header passage 2, it is possible to sequentially change the internal passages 3 to be cleaned.

[Change of Cleaning Fluid Supply Target—Part 3—]

In the supply pipe 6 (65) shown in configuration example 3 described above, the supply pipe body 65*a* which has the plurality of types of openings 65*a*1, 65*a*2, 65*a*3 disposed at the plurality of positions in the extension direction of the header passage 2 and at the different circumferential positions is rotated in the sleeve 65*b* to sequentially change the internal passages 3 to be supplied with the cleaning fluid.

With such method, by forming the sleeve 65*b* by the soft material with respect to the header passage 2, it is possible to suppress damage to the header passage 2. Further, the supply pipe body 65*a* can be rotated with respect to the sleeve 65*b*, allowing the supply pipe body to smoothly rotate.

[Determination of Presence/Absence of Blockage in Internal Passage 3]

Figure 13:
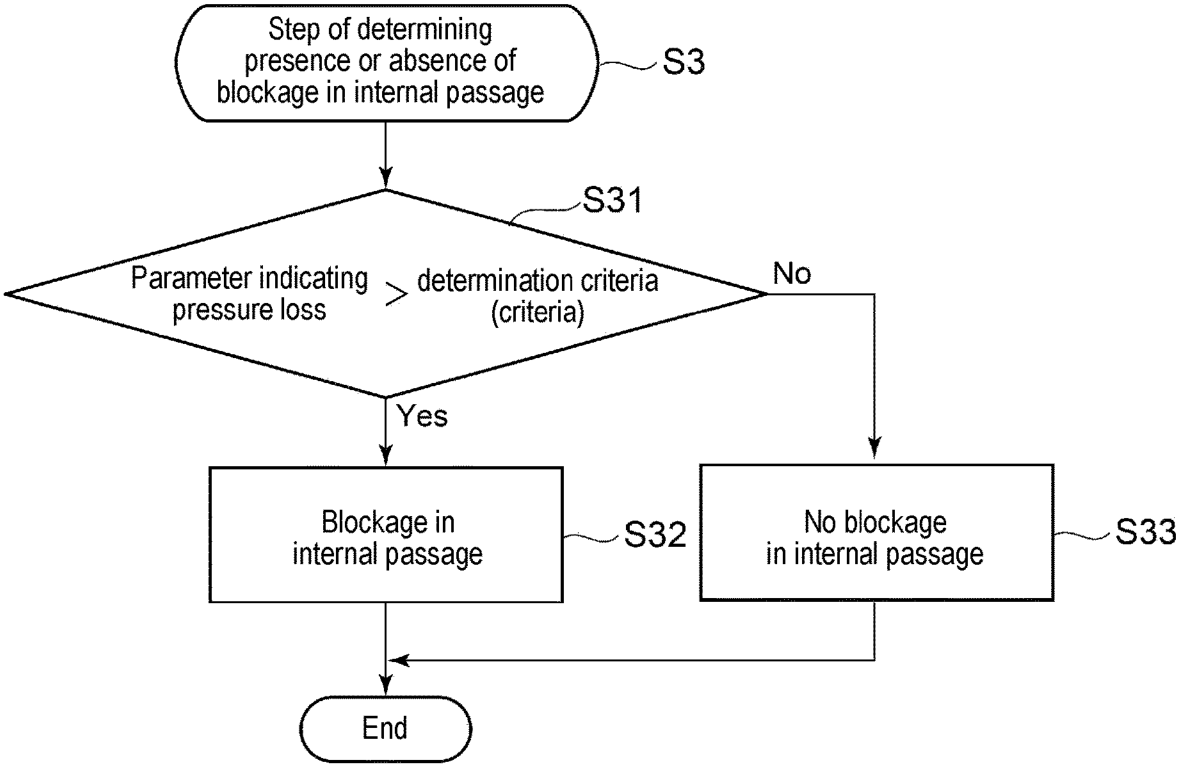
FIG. 13 is a flowchart showing the contents of a step of detecting a parameter indicating a pressure loss shown in FIG. 11.
Figure 14:
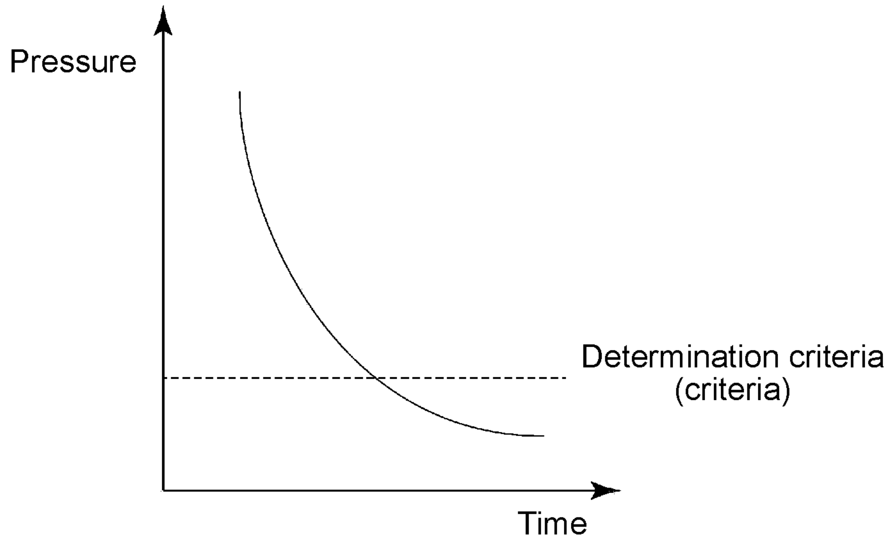
FIG. 14 is a graph showing the contents of a step of determining the presence or absence of blockage in an internal passage shown in FIG. 11.

Further, as shown in FIG. 11, the cleaning method for the heat exchanger 1 includes a step (step S2) of detecting the parameter indicating the pressure loss and a step (step S3) of determining the presence or absence of blockage in the internal passage 3. The step (step S2) of detecting the parameter indicating the pressure loss is the step of detecting the parameter indicating the pressure loss of the internal passage 3 while supplying a pressurized fluid from the supply line 7 to the internal passage 3 via the header passage 2. The parameter indicating the pressure loss is the pressure on the upstream side of the header passage 2, the flow rate passing through the internal passage 3, or the like, and is composed of, for example, the pressure gauge or the flow meter. The step (step S3) of determining the presence or absence of the blockage in the internal passage 3 is a step of determining the presence or absence of the blockage in the internal passage 3 based on a detection value of the parameter indicating the pressure loss. The parameter indicating the pressure loss is, for example, the pressure on the upstream side of the header passage 2 and as shown in FIG. 13, if the pressure on the upstream side of the header passage 2 exceeds determination criteria (criteria) (step S31: Yes), it is determined that the internal passage 3 is blocked (step (step S32)), and if the pressure on the upstream side of the header passage 2 is below the determination criteria, it is determined that the internal passage 3 is not blocked (step S33). As shown in FIG. 14, for example, the determination criterion is addition of a predetermined margin (for example, 10% of a parameter indicating a pressure loss measured when the heat exchanger 1 is completed) to the parameter indicating the pressure loss measured when the heat exchanger 1 is completed.

With such cleaning method for the heat exchanger 1, since the presence or absence of the blockage in the internal passage 3 is determined based on the detection value of the parameter indicating the pressure loss of the internal passage 3, it is possible to efficiently clean the internal passage 3, such as intensively clean the internal passage 3 where the presence of the blockage is determined.

[Cleaning of Internal Passage 3]

Further, in the cleaning method for the heat exchanger 1, in the step (step S2) of detecting the parameter indicating the pressure loss, if the parameter indicating the pressure loss exceeds the determination criterion (criteria), the boosting device 8 applies pressure fluctuations to the cleaning fluid supplied to the plurality of internal passages 3, heats the cleaning fluid, or vibrates the heat exchanger 1.

[Step (Step S2) of Detecting Parameter Indicating Pressure Loss]

The step (step S2) of detecting the parameter indicating the pressure loss includes detecting a supply pressure of the cleaning fluid serving as the pressurized fluid from the supply line 7 and based on the supply pressure of the cleaning fluid, determining an end timing of supplying the cleaning fluid. For example, since it is determined that the internal passage 3 is not blocked if the pressure on the upstream side of the header passage 2 is below the determination criteria (criteria), the end timing is determined when the upstream side of the header passage 2 is below the determination criteria. Further, for example, even if the pressure on the upstream side of the header passage 2 exceeds the determination criteria, the blockage in the internal passage 3 is not improved when a predetermined time elapses, and thus this is also determined as the end timing.

With such cleaning method for heat exchanger 1 including the step (step S2) of detecting the parameter indicating the pressure loss, since the end timing of supplying the cleaning fluid is determined based on the supply pressure of the cleaning fluid, it is possible to prevent an excessive supply of cleaning fluid.

[Inspection Method for Heat Exchanger 1]

The inspection method for the heat exchanger 1 according to the embodiment of the present disclosure is an inspection method for the heat exchanger 1 which includes the header passage 2 and the plurality of internal passages 3 connected to the header passage 2. The inspection method for the heat exchanger 1 includes a step of detecting the pressure of the supply line 7 and a step of determining the presence or absence of the internal passage 3. The step of detecting the pressure of the supply line 7 is the step of detecting the pressure of the supply line 7 while supplying the pressurized fluid from the supply line 7 to the internal passage 3 via the header passage 2. The step of detecting the blockage in the internal passage 3 is a step of determining the presence or absence of the blockage in the internal passage 3 based on a detection value of the pressure of the supply line 7. For example, if the pressure of the supply line 7 exceeds the determination criteria (criteria), it is determined that the internal passage 3 is blocked, and if the pressure of the supply line 7 is below the determination criteria, it is determined that the internal passage 3 is not blocked.

With such inspection method for the heat exchanger 1, it is possible to determine the presence or absence of the internal passage 3 based on the detection value of the pressure of the supply line 7.

The present invention is not limited to the above-described embodiments, and also includes an embodiment obtained by modifying the above-described embodiments and an embodiment obtained by combining these embodiments as appropriate.

The contents described in the above embodiments would be understood as follows, for instance.

(1) A cleaning method for a heat exchanger 1 according to one aspect is a cleaning method for a heat exchanger 1 which includes a header passage 2 and a plurality of internal passages 3 connected to the header passage 2, that includes: a step (step S1) of supplying a cleaning fluid, via the header passage 2, to some of the plurality of internal passages 3 connected to the header passage 2, selectively.

With the cleaning method for the heat exchanger 1 according to the present disclosure, the plurality of internal passages 3 connected to the header passage 2 are cleaned in a plurality of batches, making it possible to efficiently clean the plurality of internal passages 3 connected to the header passage 2 with a small amount of the cleaning fluid.

(2) The cleaning method for the heat exchanger 1 according to another aspect is the cleaning method for the heat exchanger 1 as defined in (1), where the plurality of internal passages 3 are connected to the header passage 2 at different positions in an extension direction of the header passage 2, respectively, and the step (step S1) of supplying the cleaning fluid includes inserting, into the header passage 2, a supply pipe 6 which has an opening 6*a* narrower than a connection area of the header passage 2 where connections 20 with the plurality of internal passages 3 are arranged, and selectively supplying the cleaning fluid to the internal passages 3 which have the connections 20 located within a formation range of the opening 6*a*.

With such method, it is possible to sequentially change the internal passages 3 to be cleaned, by sequentially changing the positions of the opening 6*a* of the supply pipe 6 with respect to the connection area where the plurality of internal passages 3 connected to the header passage 2 are arranged.

(3) The cleaning method for the heat exchanger 1 according to still another aspect is the cleaning method for the heat exchanger 1 as defined in (2), where a plurality of types of the supply pipe 6 (61, 62, 63) different in formation position of the opening 61*a*, 62*a*, 63*a* in the extension direction are exchanged to sequentially change the internal passages 3 to be supplied with the cleaning fluid.

With such method, by sequentially exchanging the supply pipes 6 (61, 62, 63), it is possible to sequentially change the internal passages 3 to be cleaned.

(4) The cleaning method for the heat exchanger 1 according to yet another aspect is the cleaning method for the heat exchanger 1 as defined in (2), where the supply pipe 6 (64), which has a plurality of types of the opening 64*a*, 64*b*, 64*c* disposed at a plurality of positions in the extension direction and at different circumferential positions, is rotated in the header passage 2 to sequentially change the internal passages 3 to be supplied with the cleaning fluid.

With such method, by sequentially rotating the supply pipe 6 (64) in the header passage 2, it is possible to sequentially change the internal passages 3 to be cleaned.

(5) The cleaning method for the heat exchanger 1 according to yet another aspect is the cleaning method for the heat exchanger 1 as defined in any one of (1) to (4), that includes: a step (step S2) of detecting a parameter indicating a pressure loss of the internal passages 3, while supplying a pressurized fluid from a supply line 7 to the internal passages 3 via the header passage 2; and a step (step S3) of determining presence or absence of blockage in the internal passages 3 based on a detection value of the parameter.

With such method, since the presence or absence of the blockage in the internal passages 3 is determined based on the detection value of the parameter indicating the pressure loss of the internal passages 3, it is possible to efficiently clean the internal passage 3, such as intensively clean the internal passage 3 where the presence of the blockage is determined.

(6) The cleaning method for the heat exchanger 1 according to yet another aspect is the cleaning method for the heat exchanger 1 as defined in (5), where the step (step S3) of detecting the parameter indicating the pressure loss includes detecting a supply pressure of the cleaning fluid serving as the pressurized fluid, and based on the supply pressure of the cleaning fluid, determining an end timing of the step of supplying the cleaning fluid.

With such method, since the end timing of supplying the cleaning fluid is determined based on the supply pressure of the cleaning fluid, it is possible to prevent an excessive supply of cleaning fluid.

(7) An inspection method for a heat exchanger 1 according to one aspect is an inspection method for a heat exchanger 1 which includes a header passage 2 and a plurality of internal passages 3 connected to the header passage 2, that includes: a step of detecting a pressure of a supply line 7, while supplying a pressurized fluid from the supply line 7 to the internal passages 3 via the header passage 2; and a step of determining presence or absence of blockage in the internal passages 3 based on a detection value of the pressure.

With such inspection method for the heat exchanger 1 according to the present disclosure, it is possible to determine the presence or absence of the blockage in the internal passages 3 based on the detection value of the pressure of the supply line 7.

(8) A cleaning equipment 5 for a heat exchanger 1 according to one aspect includes: a supply pipe 6 which has an opening 6*a* narrower than a connection area of the header passage 2 where connections 20 with the plurality of internal passages 3 are arranged; a supply line 7 connected to the supply pipe 6; and a boosting device 8 for raising a pressure of a fluid supplied to the supply line 7.

With the cleaning equipment 5 for the heat exchanger 1 according to the present disclosure, it is possible to sequentially change the internal passages 3 to be cleaned, by sequentially changing the positions of the opening of the supply pipe 6 with respect to the connection area where the connections 20 with the plurality of internal passages 3 connected to the header passage 2 are arranged.

(9) The cleaning equipment 5 for the heat exchanger 1 according to another aspect is the cleaning equipment 5 for the heat exchanger 1 as defined in (8), where the supply pipe 6 (64) has a plurality of types of openings 64*a*, 64*b*, 64*c* disposed at a plurality of positions in an extension direction of the header passage 2 and at different circumferential positions.

With such configuration, by sequentially rotating the supply pipe 6 (64) in the header passage 2, it is possible to sequentially change the internal passages 3 to be cleaned.

(10) The cleaning equipment for the heat exchanger 1 according to still another aspect is the cleaning equipment 5 for the heat exchanger 1 as defined in (8), where the supply pipe 6 (65) includes: a supply pipe body 65*a* which has a plurality of types of openings 65*a*1, 65*a*2, 65*a*3 disposed at a plurality of positions in an extension direction of the header passage 2 and at different circumferential positions; and a sleeve 65*b* into which the supply pipe body 65*a* is slidably inserted and which has an opening 65*b*1 over the entire connection area.

With such configuration, by forming the sleeve 65*b* by the soft material with respect to the header passage 2, it is possible to suppress damage to the header passage 2. Further, the supply pipe body 65*a* can be rotated with respect to the sleeve 65*b*, allowing the supply pipe body 65*a* to smoothly rotate.

(11) Further, the cleaning equipment 5 for the heat exchanger 1 according to yet another aspect is the cleaning equipment 5 for the heat exchanger 1 as defined in any one of (8) to (10), that includes: a detection device 9 for detecting a parameter indicating a pressure loss of the internal passages 3.

With such configuration, since the detection device 9 detects the parameter indicating the pressure loss of the internal passages 3, it is possible to determine the presence or absence of blockage in the internal passage 3 to be cleaned.

REFERENCE SIGNS LIST

1 Heat exchanger
111 Outer wall (bottom wall)
116 Outer wall (top wall)
121 First header
122 Second header
123 Third header
124 Fourth header
2 Header passage
20 Connection
21 First header passage
22 Second header passage
23 Third header passage
24 Fourth header passage
3 Internal passage
31 First passage
311 Divided passage
32 Second passage
321 Divided passage
33 Partition wall
34 Dividing wall
4 Intermediate passage
41 First intermediate passage
42 Second intermediate passage
5 Cooling equipment
6 Supply pipe
6*a* Opening
61, 62, 63 Supply pipe
61*a*, 62*a*, 63*a* Opening
64 Supply pipe
64*a*, 64*b*, 64*c* Opening
65 Supply pipe
65*a* Supply pipe body
65*a*1, 65*a*2, 65*a*3 Opening
65*b* Sleeve
65*b*1 Opening
7 Supply line
8 Boosting device
9 Detection device

The invention claimed is:

1. A cleaning method for a heat exchanger which includes a header passage and a plurality of internal passages connected to the header passage, comprising:

wherein the plurality of internal passages are connected to the header passage at different positions in an extension direction of the header passage, respectively, and supplying a cleaning fluid, via the header passage, to some of the plurality of internal passages connected to the header passage, selectively, wherein supplying the cleaning fluid includes inserting into the header passage, a supply pipe which has an opening narrower than a connection area of the header passage where connections with the plurality of internal passages are arranged, and selectively supplying the cleaning fluid to the internal passages which have the connections located within a formation range of the opening, and wherein a plurality of types of the supply pipe different in formation position of the opening in the extension direction are exchanged to sequentially change the internal passages to be supplied with the cleaning fluid.

2. The cleaning method for the heat exchanger according to claim 1, comprising:

detecting a parameter indicating a pressure loss of the internal passages, while supplying a pressurized fluid from a supply line to the internal passages via the header passage; and determining presence or absence of blockage in the internal passages based on a detection value of the parameter.

3. The cleaning method for the heat exchanger according to claim 2, detecting the parameter indicating the pressure loss includes detecting a supply pressure of the cleaning fluid serving as the pressurized fluid, and based on the supply pressure of the cleaning fluid, determining an end timing of the step of supplying the cleaning fluid.

4. A cleaning equipment for a heat exchanger, comprising:

a supply pipe which has an opening narrower than a connection area of a header passage where connections with a plurality of internal passages are arranged;

a supply line connected to the supply pipe; and a boosting device for raising a pressure of a cleaning fluid supplied to the supply line;

wherein the supply pipe includes:

a supply pipe body which has a plurality of types of openings disposed at a plurality of positions in an extension direction of the header passage and at different circumferential positions; and a sleeve into which the supply pipe body is slidably inserted and which has an opening over the entire connection area.

5. The cleaning equipment for the heat exchanger according to claim 4, comprising:

a detection device for detecting a parameter indicating a pressure loss of the internal passages.

* * * * *